(12) United States Patent
Wang et al.

(10) Patent No.: US 12,380,205 B2
(45) Date of Patent: Aug. 5, 2025

(54) SECURE WORKFLOWS THAT ENHANCE DATA SECURITY

(71) Applicant: Google LLC, Mountain View, CA (US)

(72) Inventors: Gang Wang, Frederick, MD (US); Nikolaus Rath, Harpenden (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/283,325

(22) PCT Filed: Dec. 12, 2022

(86) PCT No.: PCT/US2022/052534
§ 371 (c)(1),
(2) Date: Sep. 21, 2023

(87) PCT Pub. No.: WO2024/096894
PCT Pub. Date: May 10, 2024

(65) Prior Publication Data
US 2025/0077643 A1    Mar. 6, 2025

Related U.S. Application Data

(60) Provisional application No. 63/421,830, filed on Nov. 2, 2022.

(51) Int. Cl.
*G06F 21/53*        (2013.01)
(52) U.S. Cl.
CPC ........ *G06F 21/53* (2013.01); *G06F 2221/034* (2013.01)
(58) Field of Classification Search
CPC ..... G06F 21/53; G06F 21/6218; G06Q 99/00; G06Q 2220/00
See application file for complete search history.

(56) References Cited

U.S. PATENT DOCUMENTS 9,003,355 B2    4/2015  Meda et al.
9,032,066 B1 *  5/2015  Erdmann ............ H04L 67/303
                                                        709/224
(Continued)

FOREIGN PATENT DOCUMENTS

WO    WO 2020198539    10/2020

OTHER PUBLICATIONS

Haidri et al., "Cost effective deadline aware scheduling strategy for workflow applications on virtual machines in cloud computing," Journal of King Saud University—Computer and Information Sciences, Jul. 1, 2020, 32(6):666-683.
(Continued)

*Primary Examiner* — Beemnet W Dada
(74) *Attorney, Agent, or Firm* — Fish & Richardson P.C.

(57) ABSTRACT

Methods, systems, and apparatus, including medium-encoded computer program products, for secure workflows that enhance data security are described. In one aspect, a digital component request is received. In response to receiving the digital component request, a multi-stage workflow for selecting a digital component is identified, and can include customizable stages. The execution of workflow stages includes: (A) identifying a given customizable stage; (B) for the stage: (i) identifying, a customization specific to the stage that generates an output for use in selecting the digital component; (ii) initiating an isolated execution environment for each customization; (iii) executing, within each isolated execution environment, the customization for which the isolated execution environment was initiated; and (iv) obtaining the output generated by the code of each isolated execution environment; and (C) executing a final stage to select a digital component based on the outputs. The selected digital component is sent to the client device.

20 Claims, 4 Drawing Sheets

(56) References Cited

U.S. PATENT DOCUMENTS

| | | |
|---|---|---|
| 9,135,292 B1* | 9/2015 | Tsun .................... G06F 16/9577 |
| 9,596,132 B1 | 3/2017 | Erdmann |
| 9,679,112 B2 | 6/2017 | Brust et al. |
| 10,019,570 B2* | 7/2018 | Wang ....................... G06F 21/53 |
| 10,984,128 B1 | 4/2021 | Hoffer |
| 10,997,265 B1 | 5/2021 | Tsun et al. |
| 11,366,681 B2 | 6/2022 | Liguori et al. |
| 2010/0241990 A1 | 9/2010 | Gabriel et al. |
| 2014/0181817 A1 | 6/2014 | Muller et al. |
| 2018/0293375 A1 | 10/2018 | Wang et al. |
| 2021/0132982 A1 | 5/2021 | Thakkar et al. |
| 2025/0086268 A1* | 3/2025 | Rath ....................... G06F 21/10 |
| 2025/0094613 A1* | 3/2025 | Wang ....................... G06F 21/53 |

OTHER PUBLICATIONS

International Search Report and Written Opinion in International Appln. No. PCT/US2022/052534, mailed on Apr. 5, 2023, 11 pages.

* cited by examiner

SECURE WORKFLOWS THAT ENHANCE DATA SECURITY

CROSS-REFERENCE TO RELATED APPLICATION

This application is a National Stage Application under 35 U.S.C. § 371 and claims the benefit of International Application No. PCT/US2022/052534, filed Dec. 12, 2022, which claims priority to U.S. Application No. 63/421,830, filed Nov. 2, 2022. The foregoing applications are incorporated herein by reference in their entirety for all purposes.

TECHNICAL FIELD

This specification relates to securely executing computing workflows in ways that enhance data security and data privacy.

BACKGROUND

Data security is vital for computing systems connected to public networks, such as the Internet. Computer systems are often protected from unauthorized access and data breaches using network security technologies, such as firewalls.

A virtual machine provides an emulated version of a computer system. A virtual machine can include emulated processing units (e.g., a central processing unit (CPU)), memory, network interfaces, and/or other computing components.

SUMMARY

This specification describes technologies related to securely performing workflows that enable non-disclosed and otherwise proprietary customization of the stages of the workflow in ways that prevent other parties from accessing the customization. A workflow is a set of executable stages through which a unit of work passes from initiation to completion. The technologies include performing workflows in isolated environments, e.g., in virtual machines, that provide secure sandboxes while still supporting full-function workflows. The techniques can further include constraints on inputs to and/or outputs from workflows or portions thereof to maintain user privacy, prevent access to confidential customizations, and enhance system integrity.

In general, one innovative aspect of the subject matter described in this specification can be embodied in methods including the operations of receiving, from a client device, a digital component request that includes a set of data. In response to receiving the digital component request, a multi-stage workflow for selecting a digital component from candidate digital components of multiple content platforms based on the set of data can be identified, and the multi-stage workflow can include one or more customizable stages. Each stage of the multi-stage workflow can be executed in a sequence defined by the multi-stage workflow. The execution can include: (A) identifying a given customizable stage in the multi-stage workflow; (B) for the given customizable stage: (i) identifying, for each of the multiple content platforms, a customization specific to the given stage provided by the content platform, wherein each customization can include computer-executable code that generates an output for use in selecting the digital component; (ii) initiating an isolated execution environment for each customization; (iii) executing, within each isolated execution environment, the computer-executable code of the customization for which the isolated execution environment was initiated; and (iv) obtaining the output generated by the computer-executable code of each isolated execution environment; and (C) executing a final stage to select a digital component based on the obtained outputs. The selected digital component can be sent to the client device. Other implementations of this aspect include corresponding apparatus, systems, and computer programs, configured to perform the aspects of the methods, encoded on computer storage devices.

These and other implementations can each optionally include one or more of the following features. A set of one or more input values can be provided for use by the computer-executable instructions. At least a subset of the set of the one or more input values can be provided as key, value pairs. Each isolated environment can include a virtual machine. An operational metric that results from executing at least one stage of the multi-stage workflow can be determined; the operational metric can be evaluated against a constraint; and in response to determining that operational metric satisfies the constraint, execution of the at least one stage can be terminated. The operational metrics can be Central Processing Unit use. Code that implements a stage of the multi-stage workflow can be received from a content provider. The code can be encrypted. The multi-stage workflow can be defined by a workflow specification. The workflow specification can include default code for at least one stage of the multi-stage workflow. In some implementations, the default code for the at least one stage of the multi-stage workflow cannot be overridden.

Particular embodiments of the subject matter described in this specification can be implemented so as to realize one or more of the following advantages. The techniques described in this document can be used to select digital components from a variety of content providers (e.g., content platforms) while preserving the privacy of the requestor. In addition, the techniques enable such digital components to be provided by content platforms while also preserving the confidentiality and integrity of techniques and proprietary logic used by the content platforms. As described further below, the system can execute stages of a workflow that is used to determine digital components, with stages that involve sensitive user data and/or confidential techniques and/or logic being executed in a virtual machine or in other appropriate isolated environments. Executing code in a virtual machine protects the privacy of the content requestor since the virtual machine can constrain access to information about the requestor. Executing code in a virtual machine protects the content platform that supplied the code since the virtual machine can ensure that the content platform's proprietary customizations remain isolated such that other content platforms never have access to the content platform's customizations. The techniques can include encrypting code for the customizations, which ensures the security, confidentiality, and integrity of the code. The techniques can also be used to ensure that data produced by stages of a workflow meet validity criteria. Such criteria can further protect requestor privacy by ensuring that stages only provide data to other stages and to content platforms that satisfies privacy constraints.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

In general, this document describes systems and techniques for selecting and distributing digital components to client devices in ways that protect user privacy and confidential data of content platforms and/or digital component providers. A secure distribution system can be configured to perform digital component selection processes that use sensitive user data so that the user data is not provided to any other entity. The secure distribution system can host and execute selection logic of various content platforms (e.g., supply side platforms and demand side platforms) when selecting digital components based on user data in manners that ensure that no other entity can access the selection logic of the content platform. In this way, both the data of the users and the content platforms is kept secure.

Ensuring the privacy of personal data is a requirement of many computing systems, especially those connected to public networks such as the Internet. Some consumers who do not trust that strong privacy protection will be enforced by a system will simply choose not to use that system. In addition, some jurisdictions have regulations that protect privacy. Such privacy guarantees can include not only how data is stored, but also processes that control data sharing with third parties.

However, some data sharing can provide utility to data consumers, especially when a consumer authorizes specific sharing. For example, private data, including aggregate private data, can be used to locate content that is both relevant and interesting to the data consumer, if the user authorizes such uses of the user's data. Absent information about the data consumer, it can be challenging for a system to provide relevant information.

One solution to balancing privacy and utility is to enable a "data custodian" to retain private data with a guarantee that the data are only used for authorized purposes. Such authorization can include which content platforms can use the data, how often, for what purpose, and so on. When a data consumer requests content, a data custodian can execute code provided by content platforms, and the result can be the selection and presentation of content that is of interest or otherwise relevant to the data consumer. In such cases, the data custodian can execute code on behalf of content platforms, and that code can use authorized subsets of the private data, but the content platforms never actually receive the private data.

However, code or other types of logic (e.g., rules) of content platforms can be a valuable business asset of the content platform. Such code can contain differentiating innovations that result in the selection of more relevant content for data consumers. For that reason, content platforms can be reluctant to provide their code to a data custodian.

In addition, executing code from multiple content platforms can create integrity issues. For example, one content platform might attempt to share data with another content platform that is not authorized to access the data. In another example, a content platform might attempt to use their code to determine how the code of another content platform operates. Thus, a need exists to ensure overall system integrity while still allowing non-disclosed, proprietary code to operate on private data.

This specification describes a workflow system that enables content platforms to execute code for each stage of the workflow; or for a subset of stages, in a virtual machine, and the result of the workflow can be recommended content. Such code supplied by a content platform to implement a stage can be called a "customization." To preserve privacy, the system can ensure that each customization is permitted to access only data that does not violate privacy constraints, and that the results generated by each customization satisfies validity constraints. In addition, the system can execute each customization in a separate virtual machine, ensuring that each customization is executed in isolation. Further, content platforms can encrypt their customizations before providing them to the system. Encrypting customizations, then executing them in isolation provides protection to these valuable data assets. In addition, encryption ensures the integrity of the customization by ensuring that customizations cannot undergo tampering before arriving at the workflow system.

Figure 1:
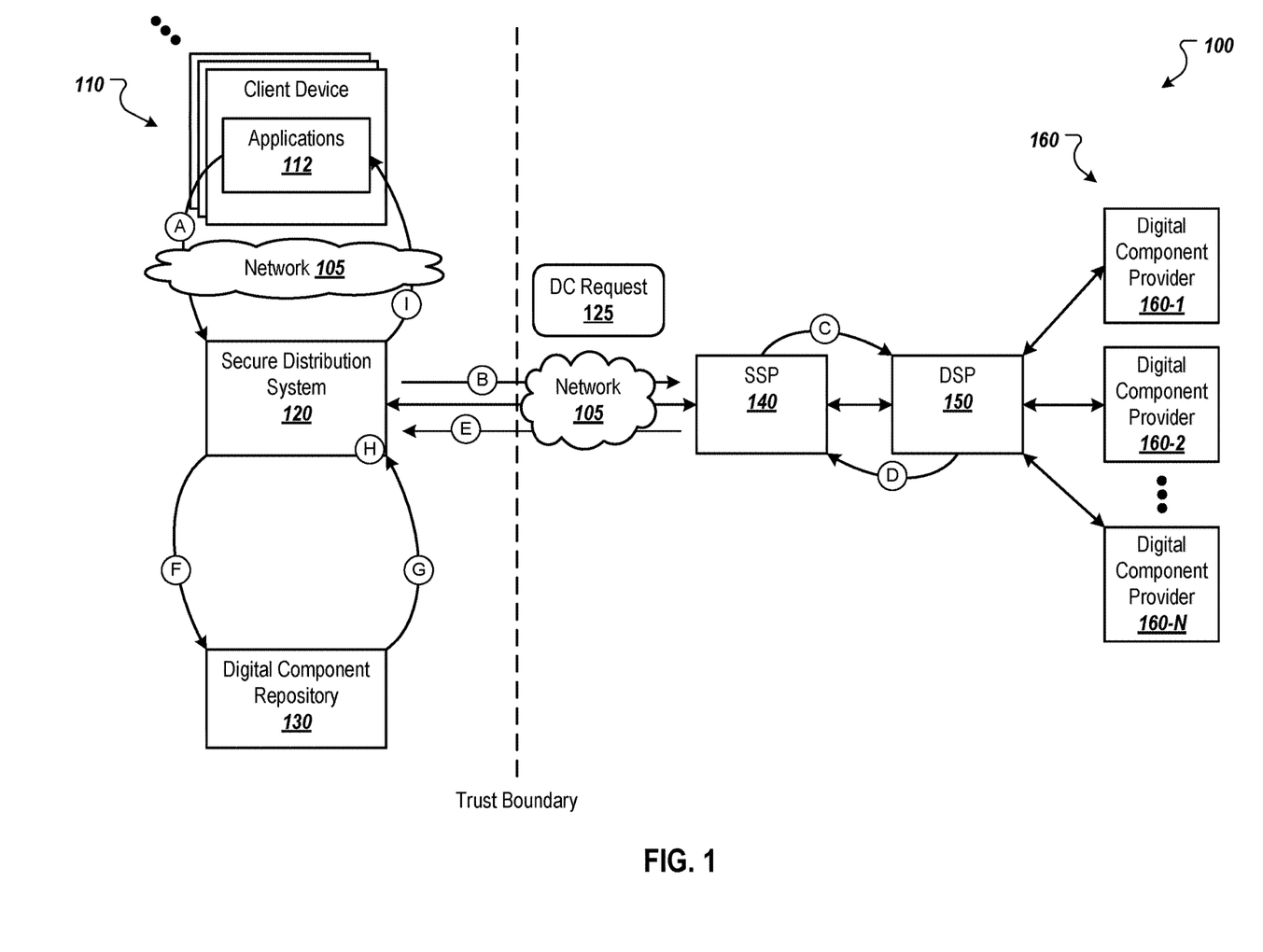
FIG. 1 shows an example environment in which a secure distribution system distributes digital components to client devices in a privacy preserving manner.

FIG. 1 is a block diagram of an example environment 100 in which a secure distribution system 120 distributes digital components to client devices 110 in a privacy preserving manner. The environment 100 includes a data communication network 105, such as a local area network (LAN), a wide area network (WAN), the Internet, a mobile network, or a combination thereof. The data communication network 105 connects client devices 110 to the secure distribution system 120 and connects the secure distribution system 120 to content platforms, such as supply side platforms (SSPs) 140 and/or demand side platforms (DSPs). The network 105 can also connect the various content platforms to one another and/or to digital component providers 160, e.g., to servers of the digital component providers 160.

A client device 110 is an electronic device that is capable of communicating over the network 105. Example client devices 110 include personal computers, server computers, mobile communication devices, e.g., smart phones and/or tablet computers, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming system, or a virtual reality system.

A client device 110 can include applications 112, such as web browsers and/or native applications, to facilitate the sending and receiving of data over the network 105. A native application is an application developed for a particular platform or a particular device (e.g., mobile devices having a particular operating system). Although operations may be described as being performed by the client device 110, such operations may be performed by an application 112 running on the client device 110.

The applications 112 can present electronic resources, e.g., web pages, application pages, or other application content, to a user of the client device 110. The electronic resources can include digital component slots for presenting digital components with the content of the electronic resources. A digital component slot is an area of an electronic resource (e.g., web page or application page) for displaying a digital component. A digital component slot can also refer to a portion of an audio and/or video stream (which is another example of an electronic resource) for playing a digital component.

An electronic resource is also referred to herein as a resource for brevity. For the purposes of this document, a resource can refer to a web page, application page, application content presented by a native application, electronic document, audio stream, video stream, or other appropriate type of electronic resource with which a digital component can be presented.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource that includes a digital component slot, the application 112 can generate a digital component request 125 that requests a digital component for presentation in the digital component slot. In some implementations, the digital component slot and/or the resource can include code (e.g., scripts) that cause the application 112 to request a digital component from the secure distribution system 120.

A digital component request 125 sent by a client device 110 can include sensitive user data related to a user of the client device 110 and/or non-sensitive data, such as generic keywords and/or a query string. The sensitive user data can include, for example, data identifying user groups that include the user as a member. The user groups can include interest-based groups. Each interest-based group can include a topic of interest and a set of members identified (e.g., determined or predicted) to be interested in the topic. The user groups can also include, for example, groups of users that performed particular actions at electronic resources (e.g., websites or native applications) of publishers. For example, a user group can include users that visited a website, users that requested more information about an item, interacted with (e.g., selected) a particular digital component and/or added an item to a virtual cart to potentially acquire the item. The user data for a user can also include user profile data and/or attributes of the user.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user" geographic location may be generalized where location information is obtained (such as to a city, ZIP code, or state level), so that a particular location of a user cannot be determined. Thus, the user may have control over what information is collected about the user, how that information is used, and what information is provided to the user.

A digital component request 125 can also include contextual data, which is generally considered non-sensitive. The contextual data can describe the environment in which a selected digital component will be presented. The contextual data can include, for example, coarse location information indicating a general location of the client device 110 that sent the digital component request 125, a resource (e.g., website or native application) with which the selected digital component will be presented, a spoken language setting of the application 112 or client device 110, the number of digital component slots in which digital components will be presented with the resource, the types of digital component slots, and other appropriate contextual information.

The secure distribution system 120 can be implemented using one or more server computers (or other appropriate computing devices), that may be distributed across multiple locations. In general, the secure distribution system 120 receives requests for digital components from client devices 110, selects digital components based on data included in the requests, and sends the selected digital components to the client devices 110.

As the secure distribution system 120 receives sensitive user data, the secure distribution system 120 can be operated and maintained by an independent trusted party, e.g., a party that is different from the users of the client devices, the parties that operate the SSPs 140 and DSPs 150, and the digital component providers 160. For example, the secure distribution system 120 can be operated by an industry group or a governmental group.

As described in more detail below; the secure distribution system 120 can select a digital component from a set of digital components stored in a digital component repository 130 and/or a set of digital components received from an SSP 140. The digital component repository 130 stores digital components received from content platforms (e.g., from SSPs 140 and/or DSPs 150) and additional data (e.g., metadata) for each digital component. The metadata for a digital component can include, for example, distribution criteria that defines the situations in which the digital component is eligible to be provided to a client device 110 in response to a digital component request received from the client device 110 and/or a selection parameter that indicates an amount that will be provided to the publisher if the digital component is displayed with a resource of the publisher and/or interacted with by a user when presented. For example, the distribution criteria for a digital component can include location information indicating which geographic locations that digital component is eligible to be presented, user group membership data identifying user groups to which the digital component is eligible to be presented, resource data identifying resources with which the electronic resource is eligible to be presented, and/or other appropriate distribution criteria. The distribution criteria can also include negative criteria, e.g., criteria indicating situations in which the digital component is not eligible (e.g., with particular resources or in particular locations). Other data that can be used to select a digital component can also be stored in the digital component repository with a reference (e.g., a link or as metadata) to its digital component.

An SSP 140 is a technology platform implemented in hardware and/or software that automates the process of obtaining digital components for the resources. Publishers of resources can use an SSP 140 to manage the process of obtaining digital components for digital component slots of its resources. Each publisher can have a corresponding SSP 140 or multiple SSPs 140. Some publishers may use the same SSP 140.

A DSP 150 is a technology platform implemented in hardware and/or software that automates the process of distributing digital components for presentation with the resources and/or applications. A DSP 150 can interact with multiple supply-side platforms SSPs on behalf of digital component providers 160 to provide digital components for presentation with the resources of multiple different publishers. Digital component providers 160 can create (or otherwise publish) digital components that are presented in digital component slots of publisher's resources.

In this example, user data does not cross a trust boundary that separates the client device 110, the secure distribution system 120, and the digital component repository from the SSP 140, DSP 150, and digital component providers 160. In this way, no entity other than the client device 110 and the secure distribution system 120 receives the user data that is included in a digital component request 125. This preserves user privacy and data security, especially when compared to techniques that employ third party cookies to send user data across the Internet.

An example process for selecting and providing a digital component for presentation at a client device 110 is illustrated in stages A-I, which illustrate a flow of data between the components of the environment 100.

In stage A, the application 112 sends a digital component request 125 to the secure distribution system 120. As described above, the application 112 can send a digital component request to request a digital component for presentation in a digital component slot of a resource being presented by the application 112. The digital component request 125 can include user data and contextual data.

In stage B, the secure distribution system 120 sends a context-based digital component request to an SSP 140. The context-based digital component request 125 can include the contextual data of the digital component request 125 received from the application 112. However, the context-based digital component request 125 does not include any of the user data. The secure distribution system 120 can temporarily store the user data while waiting for a response from the SSP 140. The secure distribution system 120 can send the context-based digital component request 125 to an SSP 140 for the publisher of the resource being presented by the application 112.

In stage C, the SSP 140 forwards the context-based digital component request 125 to one or more DSPs 150. In stage D, each DSP 150 sends, to the SSP 140, one or more selection parameters for one or more digital components, e.g., digital components stored in the digital component repository 130. For example, the DSP 150 can select a digital component based on the contextual data of the context-based request and determine a selection parameter for the digital component based on the contextual data. The DSP 150 can also provide a digital component and selection parameter, e.g., a digital component that is not stored in the digital component repository 130. Each DSP 150 can send a selection parameter with data indicating the digital component to which the selection parameter applies. The digital components for which selection parameters are provided by the DSPs 150 can be referred to as context-based digital components.

In stage E, the SSP 140 sends the digital components and/or selection values to the secure distribution system 120. In some implementations, the SSP 140 can filter digital components and/or selection parameters prior to sending the digital components and/or selection values to the secure distribution system 120. For example, the SSP 140 can filter digital components and/or selection parameters based on publisher controls specified by the publisher of the resource being presented by the application 112. In a particular example, a publisher of a web page about a particular event may define, as a publisher control, that digital components related to another event may not be presented with this web page. The SSP 140 can filter based on rules or other data provided by the publisher.

In stage F, the secure distribution system 120 queries the digital component repository 130 for a set of user-based digital components that are selected based on the user data of the digital component request 125. For example, the secure distribution system 120 can submit a query that defines, as conditions of the query, the user data of the digital component request 125. In some implementations, the query can also include context-based conditions. For example, a query can request retrieval of digital components that include, as distribution criteria, a particular user group and/or a particular geographic location. Although shown after stages B-E, the secure distribution system 120 can query the digital component repository in parallel with these stages to reduce the latency in selecting and providing a digital component to the application 112.

In stage G, the secure distribution system 120 receives a set of user-based digital components from the digital component repository 130 and a selection parameter for each user-based digital component. The set of user-based digital components can include those having distribution criteria that matches the conditions of the query.

In stage H, a selection engine 122 of the secure distribution system 120 selects a digital component to provide to the application 112 for presentation in the digital component slot. The selection engine 122 can select a digital component from the set of context-based digital components and the user-based digital components. The selection engine 122 can select the digital components from the two sets based on the selection parameter for each digital component in the two sets. For example, the selection engine 122 can select the digital component having the highest selection parameter.

In stage I, the secure distribution system 120 provides the selected digital component to the application 112. The application 112 can then present the digital component with the resource being presented by the application 112.

Figure 2:
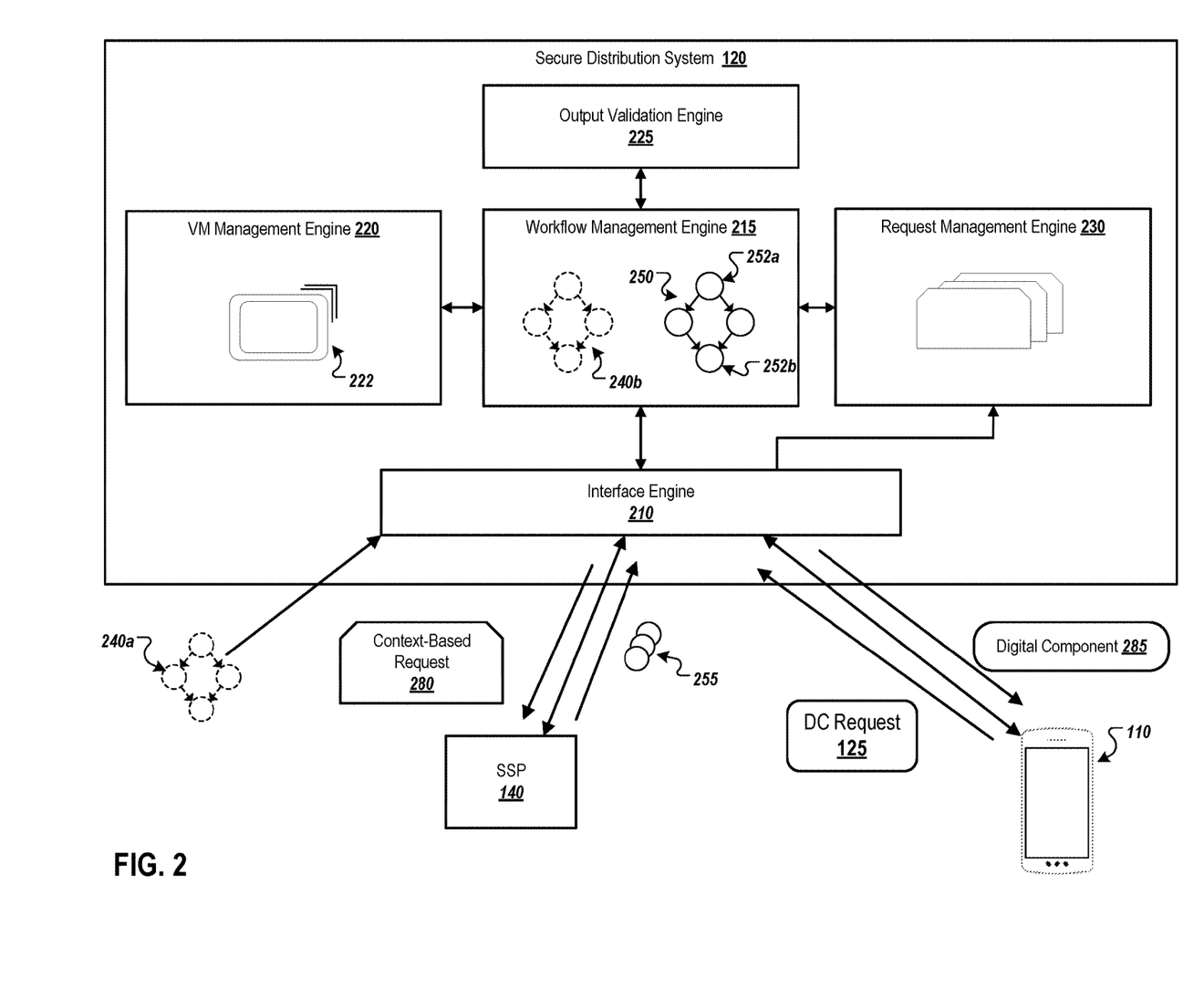
FIG. 2 shows components of the secure distribution system of FIG. 1 in more detail.

FIG. 2 shows components of the secure distribution system 120 of FIG. 1 in more detail. In general, the secure distribution system 120 can receive digital component requests 125 from client devices 110, securely execute workflows 250, and provide digital components 285 to client devices 110. The secure distribution system 120 can include an interface engine 210, a workflow management engine 215, a virtual machine (VM) management engine 220, an output validation engine 225 and a request management engine 230.

The interface engine 210 is configured to accept workflow specifications 240a, customizations 255 and digital component requests 125, and can provide digital components 285 and/or references to digital components 285, e.g., Uniform Resource Locators (URLs), which enable client devices 110 to download the referenced digital components 285 from servers. The interface engine 210 can include an application programming interface (API) that is configured to accept data (e.g., workflow specification 240a, customizations 255 and digital component requests 125) provided to the secure workflow system 105 and to provide data (e.g., digital components 285) to other components in the environment 100 of FIG. 1.

A workflow specification 240a, 240b (collectively workflow specification 240) can define the structure of a workflow, and can include a description of stages 252a, 252b (collectively stages 252) of a workflow, including interconnections among the stages 252 and constraints on the inputs and outputs to a stage 252.

A workflow specification 240 can be instantiated into a particular workflow 250 by the workflow management engine 215, and the same workflow specification 240 can be instantiated multiple times into multiple workflows 250, e.g., for multiple content platforms—i.e., workflow management engine 215 can execute workflows 250 instantiated from a single workflow specification 240 for each of multiple content platforms. Each content platform can provide customizations 255 that provide implementations for stages 252 of the workflow 250 executed by the secure distribution system 120 on their behalf. As described further below, to provide privacy of user data, in some implementations, each stage 252 of a workflow 250 can be executed in a separate virtual machine instance 222, and in some implementations, all stages of a workflow 250 executed on behalf of a content platform are executed in a single virtual machine instance 222. The workflow specification 240 can use any appropriate technique for defining a workflow structure. For example, a workflow can be described as a graph where nodes of the graph are stages 252 of the workflow, and edges in the graph show inputs and outputs to stages 252. In some workflows, outputs from one stage become inputs to another stage 252, or to multiple other stages 252, and stages 252 can also obtain inputs for sources other than another stage 252. In addition, output from a stage 252 can be processed before it becomes input to another stage 252. For example, output can be validated before it is passed to another stage 252, as described further below.

A workflow specification 240 can include default code for any subset of the workflow stages 252, for none of the stages 252, or for all of the stages 252. The default code provides a base implementation of the stage, reducing the coding burden for parties providing customizations 255 that do not wish to provide customizations 255 for all stages 252. A workflow specification 240 can also include indications that particular stages cannot be overridden or otherwise customized, and the default code must always be used for the stage. Stages in a workflow specification 240 that can be overridden can be called "customization points."

For example, the secure distribution system 120 can perform a digital component selection process to select digital components to provide to client devices 110 based on user data and/or other data, such as distribution criteria for each digital component, contextual data, and/or other appropriate data. The digital component selection process can have multiple stages 252 defined by a workflow specification 240. The overall sequence of stages can be rigid such that there are no customizations by content platforms (e.g., SSPs 140 and/or DSPs 150). However, the processes performed in some stages may be customized by the content platforms. For example, the digital component selection process can have a stage in which a digital component request 125 is processed to extract data from the request 125. This stage may be a default stage in which default code that cannot be customized by content platforms is used by the workflow management engine 215. A later stage can include obtaining candidate digital components and corresponding selection parameters. At this stage, the workflow management engine 215 can execute customizations provided by the content platforms to select the candidate digital components and generate the corresponding selection parameters. As the logic provided by the content platforms is typically considered confidential, this logic can be securely stored by the secure distribution system 120 and can execute in isolated environments, e.g., within content platform specific virtual machines, as described in more detail below. After the candidate digital components are obtained, the workflow management system 215 can perform another default stage to select a digital component 285 from the candidate digital components to provide to the client device 110 from which the digital component request 125 was received.

In some implementations, metadata can be included in, or associated with, the workflow specification 240. Such metadata can include, but is not limited to, the author of the workflow specification 240, its version, time of creation, owner, etc. The metadata can also include criteria that indicate whether the workflow defined by the workflow specification 240 is appropriate for a digital component request 125. For example, one workflow specification 240 might be appropriate for requests for textual digital components 285 while a different workflow specification 240 is appropriate for requests for multimedia digital components 285. The secure distribution system 120 can use such metadata to select a workflow specification 240 appropriate for a particular digital component request 125. The metadata can also include an identifier for the workflow specification 240.

A customization 255 can be computer-executable instructions that define the operation of a stage 252 of a workflow 250. The instructions for a customization 255 can be expressed as executable instructions (e.g., bytecodes) and/or in any appropriate programming language, including scripting languages, and different customizations 255 can be expressed in any combination of executable instructions and programming languages, which can be different programming languages. For example, customizations 255 can be specified as C, C++, Python, and/or other example types of code.

Customizations can be grouped into workflow descriptions, where a workflow description is an implementation of a workflow specification 240, or a portion of a workflow specification 240, and more specifically, workflow descriptions can include one or more customizations 255, each implementing a customization point in a workflow specification 240. A customization 255 can also include one or more identifiers that specify the stage in a workflow specification that the customization implements. For example, if a workflow specification 240 includes stages A, B, C and D, a content platform can provide workflow descriptions that contain customizations 255 for stages A, B, C and D or some portion thereof. When the secure distribution system 120 instantiates, on behalf of a content platform, a workflow specification 240 into a workflow 250, the secure distribution can use the customizations 255 for each of stages A, B, C and D provided by the content platform. To simplify the management of the customizations, a content provider can group the customizations 255 into a workflow description or the content provider can provide the customizations 255 individually.

The workflow management engine 215 can execute workflows as specified by workflow specifications 240 and customizations 255. The workflow management engine 215 can obtain a virtual machine (VM) instance 222 from the VM management engine 220, and instruct the virtual machine instance 222 to execute the instructions as specified by the customization 255. A VM instance 222 can emulate the operation of a physical computing device, while isolating the instructions performed by the VM from the computing device and from other VM instances. In cases where no customization 255 exists for a stage 252, the VM instance 222 can execute default code for the stage 252 as specified by the workflow specification 240. Executing customizations 255 in VM instances 222 provides isolation of customization 255 both from customizations 255 provided by other content providers, and from resources in the secure distribution system 120 to which a customization 255 is forbidden to access.

The VM management engine 220 can create VM instances 122, destroy VM instances 222, and assign VM instances 222 to workflow stages 252, among other VM management operations. The VM management engine 220 can include an API, which, when called by the workflow management engine 215, causes the VM management engine 220 to create a VM instance 222 and provide a reference to the VM instance 222 to the workflow management engine 215. The workflow management engine 215 can assign the VM instance 222 to a stage 252 of a workflow 250, and execute the instructions for the stage 252 (which can be a customization 255) in the VM instance 222.

In some implementations, VM management engine 220 can deploy each virtual machine or other isolated environment in a sandbox environment. In this way, the VM management engine 220 can control the data that is provided to each virtual machine or sent from each virtual machine, which can prevent logic of a content platform from sending sensitive data, e.g., user data, outside of the secure distribution system 110. This further enhances user privacy in the generation of dynamic digital content by preventing leakage if sensitive user data from the secure distribution system 110.

The output validation engine 225 can accept output from the stage 252 of a workflow, which can be implemented by a customization 255, and determine whether the output satisfies criteria imposed on the output. In various implementations, the criteria are included in the workflow specification 240; the criteria are configured into the workflow management engine 215, e.g., by an authorized administrator of the secure distribution system 110; and/or the workflow management engine 215 obtains the criteria using other techniques, such as reading them from a storage device. If the output validation engine 225 determines that an output does not satisfy the criteria, the output validation engine can indicate to the workflow management engine 215 that the workflow 250 should be halted.

The criteria can be expressed in any suitable format and can be expressed using any property of the output and/or any property of the system. For example, the criteria can be expressed as Boolean expressions. Criteria can include types of values produced (e.g., the output must be an integer, floating point number, string, array, Boolean, etc.), ranges of values produced (e.g., a value must be between a minimum and maximum value), limits of values produced (e.g., a value cannot exceed a threshold value), and so on. Criteria can be expressed for specific content platforms, for classes of content platforms (e.g., providers of images or providers of multimedia), for all content platforms, etc.

The request management engine 230 can accept digital component requests 125 from the interface engine 210, and provide the request 125 (or data from the request 125) to the workflow management engine 215. A digital component request 125 can be any appropriate specification of content. For example, a digital component request 125 can be a query string, and can include user data and/or context data provided by a client device 110, as described above. The workflow management engine 215 can use the digital component request 125 and metadata associated with workflow specifications 240 to determine an appropriate workflow specification 240 for the digital component request 125. For example, if the request is for an image, the workflow management engine 215 can select a workflow configured to select digital components 285 that are in the form of, or that include, images.

Figure 3:
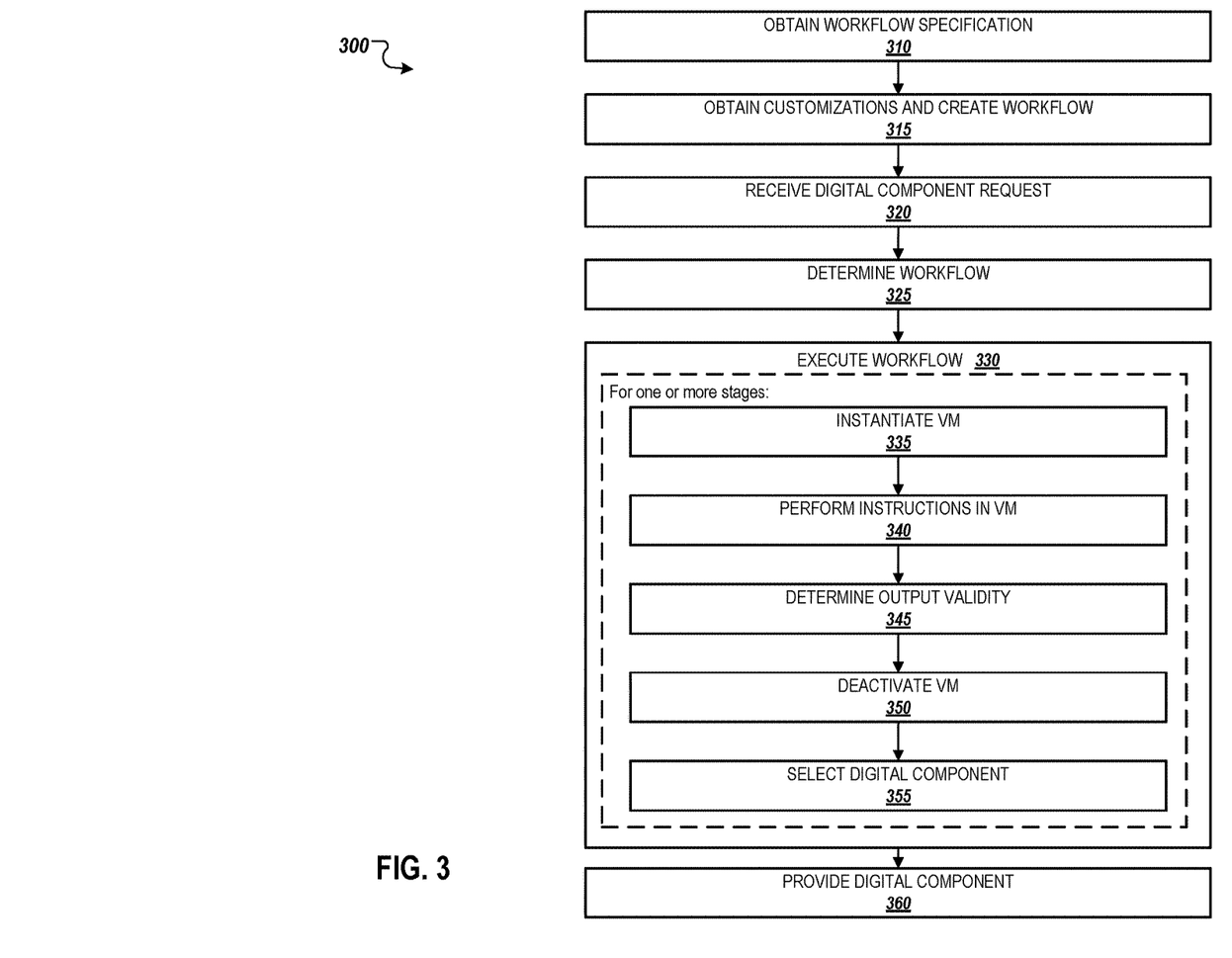
FIG. 3 is a flow diagram of an example process for executing secure workflows for content selection.

FIG. 3 is a flow diagram of an example process 300 for executing secure workflows for content selection. For convenience, the process 300 will be described as being performed by a system for executing secure workflows for content selection, e.g., the secure distribution system 120 of FIGS. 1 and 2, appropriately programmed to perform the process. Operations of the process 300 can also be implemented as instructions stored on one or more computer readable media which may be non-transitory, and execution of the instructions by one or more data processing apparatus can cause the one or more data processing apparatus to perform the operations of the process 300. One or more other components described herein can perform operations of the process 300.

The system obtains (310) a workflow specification. For example, the system can include an API that is configured to accept workflow specifications. In another example, the system can accept data containing the workflow specification over a network, e.g., data passed using Transmission Control Protocol/Internet Protocol (TCP/IP), Hypertext Transfer Protocol (HTTP) or HTTP-Secure (HTTP-S). In still another example, the system can obtain a workflow specification from a storage device using an API appropriate for the storage device or from a database using Structured Query Language (SQL). As noted above, the workflow specification can define the structure of a workflow and can include, in some examples, default code for stages of the workflow.

The system obtains (315) customizations, which can be included in one or more workflow descriptions. The system can obtain customizations using any appropriate technique. For example, the system can accept customizations included in data received over a networking protocol such as TCP/IP, HTTP or HTTP-S. In another example, the system can include an API, which, when called by parties such as content providers, enables the parties to provide customizations. As described above, each customization can be configured to implement a stage of a workflow specification. Multiple parties, which can be content platforms, can provide customizations, and parties can provide multiple workflow descriptions, each configured to implement the stages of a different workflow specification.

In some implementations, to secure the workflow description, a customization can be encrypted by the submitting party and decrypted by the system using any appropriate encryption technique. For example, the system can publish a public key (e.g., by storing the public key at a known, accessible location). Submitting parties can obtain the public key, encrypt the customization (or multiple customizations in a workflow description) using the public key, and provide the encrypted customization and/or encrypted workflow description to the system. The system can decrypt the encrypted customization and/or workflow description using its private key that corresponds to the public key used by the submitting party.

The system can create a workflow from the workflow specification and the customizations. As described above, customizations can include an identifier of the stage of a workflow specification that the customization implements. For each stage included in the workflow specification, the system can include the default code for the stage from the workflow specification, and for customization points (i.e., stages of the workflow specification that can be overridden), replace the code for the stage with code included in the corresponding customization. If the system obtains a customization for a stage that is not a customization point, the system can ignore the customization and/or provide an error message.

The system receives (320) a request for a digital component using any appropriate technique. For example, the system can receive the digital component request 125 over HTTP or SQL. As described above, a digital component request 125 can contain a description of the digital component requested (e.g., a search string), user data, and/or contextual data, as described above.

In response to receiving the request, the system determines (325) a multi-stage workflow for selecting personalized content from candidate content of multiple content platforms. As described above, the metadata associated with a workflow specification can include criteria that indicate whether the workflow is appropriate for a particular digital component request 125. The system can determine whether the criteria are satisfied to determine a workflow for execution. For example, criteria might specify that a workflow specification is appropriate for requests that are received from particular geographical regions where location-specific regulations apply. In such cases, the system can evaluate the criteria associated with the workflows to select a workflow appropriate for requests from that region.

The system executes (330) each stage of the multi-stage workflow to determine at least one output value. Executing the workflow can include various operations, as described below.

For at least a subset of the content platforms that provided stages, which can be customizations, relevant to a digital component request 125, the system can execute the stages of the workflow determined in operation 225. Executing a stage can include instantiating (335) a VM instance configured to isolate a set of executable instructions provided by the content platform (e.g., the customization for the stage). The system can instantiate a VM instance using a hypervisor that is configured to instantiate VM instances or using any other suitable techniques for instantiating VM instances. The system can then execute the code for the stage in a VM instance. Thus, in some implementations, the system executes each stage in a separate, isolated VM instance, and the isolation ensures that the VM instance can access only the system resources for which the VM instance has access permission. For example, the system can execute, for each customizable stage, the customization of each content platform for that stage in its own separate and isolated VM. Such a system provides isolation among all stages, regardless of whether they were provided by a single content platform or multiple content platforms. In addition, in some implementations, the system can execute multiple stages provided by a given content platform in a single VM instance. Using a single VM instance to execute multiple stages can reduce the computational requirements of the computing system by reducing the number of required VM instances.

The system performs (340) the executable instructions of the stage within the VM to determine the at least one output value. The system can include one or more execution environments (e.g., Java Virtual Machines, JavaScript engines, and Python engines, among other alternatives) that are configured to perform executable instructions, which can determine an output value used to select the digital component. In some implementations, the workflow can include multiple stages, where the end stage selects a digital component directly from a set of candidate digital components, and the output of intermediate stages can influence the operation of the end stage (e.g., by selecting the candidates and/or generating selection parameters for the candidates), thereby influencing the selection of the digital component. As described above, the workflow specification and customizations can include code specified using any appropriate programming language or as executable instructions such as bytecodes. The results of each stage can be returned to the system for delivery to the next stage and/or for use selecting a digital component. The results of a stage can also be evaluated using validity criteria, as described below.

When executing within a VM, implementations of stages can access input data necessary for performing the stage. The input data can be stored in any appropriate format and can be stored on any appropriate storage device. For example, the input data can be stored as (key, value) pairs, where the stage accesses data by providing a key, and the system can provide the value associated with the key. In various implementations, the input data can be stored in a database and obtained using SQL queries and/or stored in a file system and accessed using a file system API.

The system can provide access control for the (key, value) pairs. For example, each (key, value) pair can be associated with an access control list, and the system can provide the (key, value) pair only if the content platform that provided a customization is included in the access control list. The system can obtain the access control list from an authorized administrator or using other suitable technique for obtaining access control lists. In some implementations, a content platform can provide a collection of (key value) pairs, and the system permits access to such collections only for the content platform that provided the collection, or to other content platforms explicitly authorized by the content platform that provided the collection.

To limit system resources consumed on behalf of a content platform, resources consumed on behalf of any subset of content platforms, or on behalf of all content platforms, the system can enforce limits on resources consumed by the entire workflow, by a subset of stages in a workflow, or by any workflow stage. Such limits can be valuable, for example, when the system is executed on a server or group of servers that provide a multi-tenant environment, and the server or servers ensure that computing resources consumed by any given tenant does not exceed a configured threshold, leaving sufficient computing resources available for other tenants. This can also reduce the overall workload on the system, which can extend the life of processing components of the system. Resources can include any operational metric such as processor time (e.g., by a Central Processing Unit(s) (CPUs), Graphics Processing Units (GPUs), Digital Signal Processor(s) (DSP), Application Specific Processor(s) (ASPs), etc.), memory use, storage use, and network use, among other operational metrics. The system can enforce limits, which can be expressed as constraints, on any aspect of resource use such as aggregate use, peak use, rate of use over some time period, and so on. Limits can also be combined in any logical combination. For example, a limit can specify a maximum peak use and a limit on aggregate use. The limits can be enforced on a particular stage, on a group of stages, on an entire workflow; on all workflows provided by a content provider, by collections of content providers, and/or on other singular or aggregate entities. If a limit is met, the system can perform a remediating action. Such actions can include, but are not limited to, terminating or delaying operation of a stage or workflow.

When a stage completes execution, the system determines (345) the validity of one or more of the output values produced by the stage. In situations in which multiple VMs are used in a stage, e.g., when there is a separate VM for each content platform for that stage, the system can determine the validity of the output(s) of each VM. As described above, criteria used to determine the validity of output can be included in the workflow specification and/or configured into the system. Such criteria can protect requestor privacy by ensuring that stages only provide data to other stages and to content providers that satisfies constraints, which can include privacy constraints. The system can evaluate the criteria using the output value to determine whether the criteria are satisfied. As described above, criteria can be expressed as function of the type output, value or values of the output, and so on.

The VM management engine can deactivate (350) the VM using any appropriate technique for deactivating a VM. For example, the system can instruct a hypervisor to deactivate the VM. Deactivating the virtual machine removes all state of the computation done by the stage, thereby ensuring the stage does not provide unauthorized content to another stage.

In response to determining that the output value is valid (e.g., as determined in operation 245), the virtualized workflow engine determines (355) a result at least in part based on the first output value from each VM. The result can be a digital component or a descriptor for a digital component. The descriptor can include a reference to one or more digital components (e.g., as indicated by a URL or URI) that are present at, or provided by, a content platform, and/or a descriptor that can be used by a content platform to determine a digital component. For example, the descriptor can include any metadata describing the digital component, such as a category of information requested (e.g., sports, fashion, news, science, etc.), depersonalized information about the requestor (e.g., general categories of demographic data such as age range, location, etc.), characteristics of the device (e.g., phone or laptop), and so on.

The system can provide (360) the result to the client device of the requestor, to the content provider or to both. When the result is a digital component provided to the client device of the requestor, the client device can display the digital component on the user interface of the client device. When the result is a descriptor for a digital component, the client device can retrieve the digital component (e.g., using HTTP to retrieve a digital component specified by a URL) and display the digital component on the user interface of the client device.

In addition, in cases where the descriptor is provided to the requestor and not to the content provider, the system can provide to the content platform an indication that the content from the provider was selected. Such information can allow a content provider to determine the popularity of digital components provided by the provider. The content provider can also use such information to refine the operation of its customizations.

Figure 4:
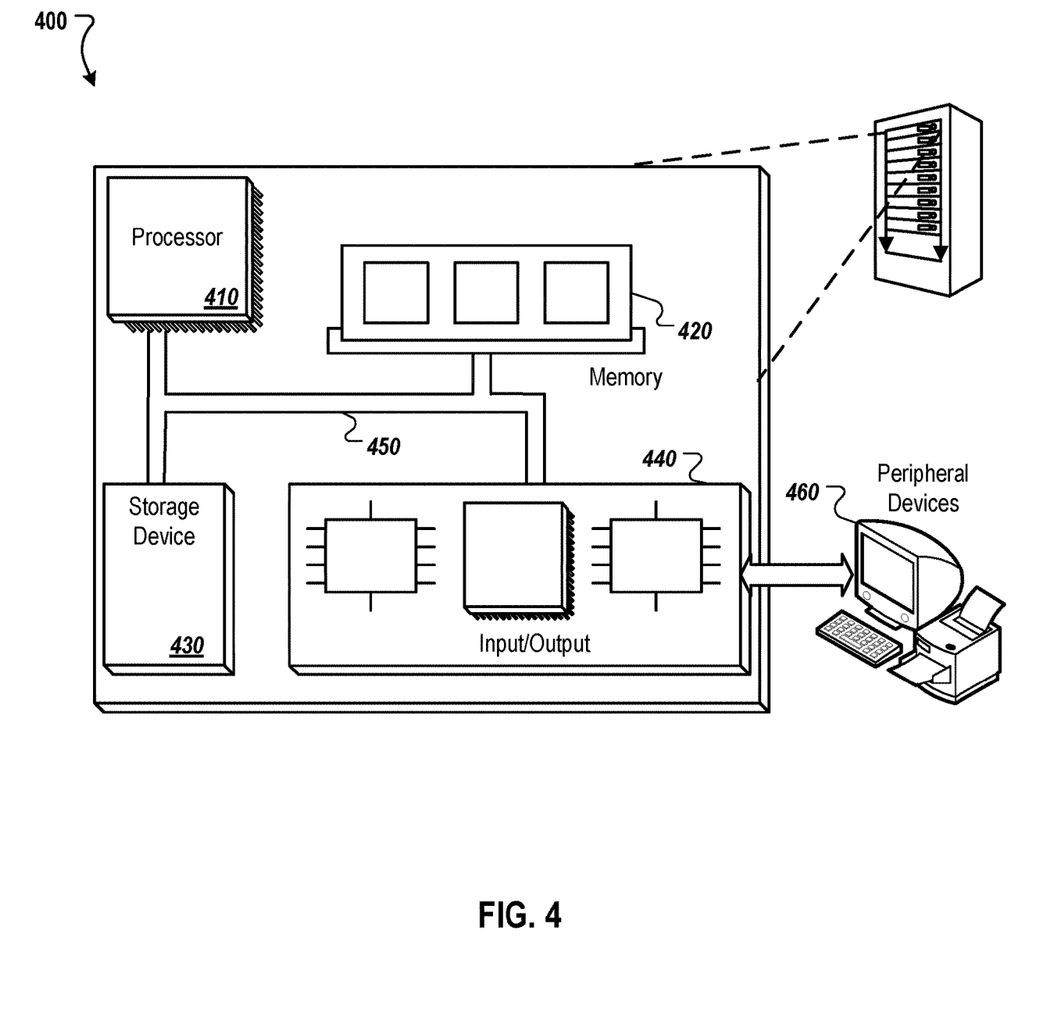
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

To provide for interaction with a user, embodiments of the subject matter described in this specification can be implemented on a computing device capable of providing information to a user. The information can be provided to a user in any form of sensory format, including visual, auditory, tactile or a combination thereof. The computing device can be coupled to a display device, e.g., an LCD (liquid crystal display) display device, an OLED (organic light emitting diode) display device, another monitor, a head mounted display device, and the like, for displaying information to the user. The computing device can be coupled to an input device. The input device can include a touch screen, keyboard and a pointing device, e.g., a mouse or a trackball, by which the user can provide input to the computing device. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
receiving, from a client device, a digital component request comprising a set of data;
in response to receiving the digital component request:
identifying a multi-stage workflow for selecting a digital component from candidate digital components of multiple content platforms based on the set of data, wherein the multi-stage workflow comprises one or more customizable stages;
executing each stage of the multi-stage workflow in a sequence defined by the multi-stage workflow, the executing comprising:
identifying a given customizable stage in the multi-stage workflow;
for the given customizable stage:
identifying, for each of the multiple content platforms, a customization specific to the given stage provided by the content platform, wherein each customization comprises computer-executable code that generates an output for use in selecting the digital component;
initiating an isolated execution environment for each customization;
executing, within each isolated execution environment, the computer-executable code of the customization for which the isolated execution environment was initiated; and
obtaining the output generated by the computer-executable code of each isolated execution environment; and
executing a final stage to select a digital component based on the obtained outputs; and
sending the selected digital component to the client device.

2. The computer-implemented method of claim 1, further comprising providing a set of one or more input values for use by the computer-executable code.

3. The computer-implemented method of claim 2, wherein at least a subset of the set of the one or more input values is provided as key, value pairs.

4. The computer-implemented method of claim 1, wherein each isolated environment comprises a virtual machine.

5. The computer-implemented method of claim 1, further comprising:
determining an operational metric resulting from executing at least one stage of the multi-stage workflow;
evaluating the operational metric against a constraint; and
in response to determining that operational metric satisfies the constraint, terminating execution of the at least one stage.

6. The computer-implemented method of claim 5, wherein the operational metrics is Central Processing Unit use.

7. The computer-implemented method of claim 1, further comprising:
receiving, from a content provider, code that implements a stage of the multi-stage workflow.

8. The computer-implemented method of claim 7, wherein the code is encrypted.

9. The computer-implemented method of claim 1, wherein the multi-stage workflow is defined by a workflow specification.

10. The computer-implemented method of claim 9, wherein the workflow specification includes default code for at least one stage of the multi-stage workflow.

11. The computer-implemented method of claim 10, wherein the default code for the at least one stage of the multi-stage workflow cannot be overridden.

12. One or more non-transitory computer-readable storage media storing instructions that when executed by one or more computers cause the one or more computers to perform operations comprising:
receiving, from a client device, a digital component request comprising a set of data;
in response to receiving the digital component request:
identifying a multi-stage workflow for selecting a digital component from candidate digital components of multiple content platforms based on the set of data, wherein the multi-stage workflow comprises one or more customizable stages;
executing each stage of the multi-stage workflow in a sequence defined by the multi-stage workflow, the executing comprising:
identifying a given customizable stage in the multi-stage workflow;
for the given customizable stage:
identifying, for each of the multiple content platforms, a customization specific to the given stage provided by the content platform, wherein each customization comprises computer-executable code that generates an output for use in selecting the digital component;

initiating an isolated execution environment for each customization;

executing, within each isolated execution environment, the computer-executable code of the customization for which the isolated execution environment was initiated; and obtaining the output generated by the computer-executable code of each isolated execution environment; and executing a final stage to select a digital component based on the obtained outputs; and sending the selected digital component to the client device.

13. A system comprising:

one or more processors; and one or more storage devices storing instructions that, when executed by the one or more processors, cause the one or more processors to perform operations comprising:

receiving, from a client device, a digital component request comprising a set of data;

in response to receiving the digital component request:

identifying a multi-stage workflow for selecting a digital component from candidate digital components of multiple content platforms based on the set of data, wherein the multi-stage workflow comprises one or more customizable stages;

executing each stage of the multi-stage workflow in a sequence defined by the multi-stage workflow, the executing comprising:

identifying a given customizable stage in the multi-stage workflow;

for the given customizable stage:

identifying, for each of the multiple content platforms, a customization specific to the given stage provided by the content platform, wherein each customization comprises computer-executable code that generates an output for use in selecting the digital component;

initiating an isolated execution environment for each customization;

executing, within each isolated execution environment, the computer-executable code of the customization for which the isolated execution environment was initiated; and obtaining the output generated by the computer-executable code of each isolated execution environment; and executing a final stage to select a digital component based on the obtained outputs; and sending the selected digital component to the client device.

14. The system of claim 13, wherein the operations comprise providing a set of one or more input values for use by the computer-executable code.

15. The system of claim 14, wherein at least a subset of the set of the one or more input values is provided as key, value pairs.

16. The system of claim 13, wherein each isolated environment comprises a virtual machine.

17. The system of claim 13, wherein the operations comprise:

determining an operational metric resulting from executing at least one stage of the multi-stage workflow;

evaluating the operational metric against a constraint; and in response to determining that operational metric satisfies the constraint, terminating execution of the at least one stage.

18. The system of claim 17, wherein the operational metrics is Central Processing Unit use.

19. The system of claim 13, wherein the operations comprise:

receiving, from a content provider, code that implements a stage of the multi-stage workflow.

20. The system of claim 19, wherein the code is encrypted.

* * * * *

UNITED STATES PATENT AND TRADEMARK OFFICE
CERTIFICATE OF CORRECTION

| | | |
|---|---|---|
| PATENT NO. | : 12,380,205 B2 | Page 1 of 1 |
| APPLICATION NO. | : 18/283325 | |
| DATED | : August 5, 2025 | |
| INVENTOR(S) | : Wang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 119 days.

Signed and Sealed this
Sixteenth Day of December, 2025

John A. Squires
*Director of the United States Patent and Trademark Office*